(12) United States Patent
Murakami

(10) Patent No.: US 9,017,214 B2
(45) Date of Patent: Apr. 28, 2015

(54) HYBRID VEHICLE CONTROL APPARATUS

(75) Inventor: Koji Murakami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/807,975

(22) PCT Filed: Oct. 3, 2011

(86) PCT No.: PCT/JP2011/072810
§ 371 (c)(1),
(2), (4) Date: Jan. 2, 2013

(87) PCT Pub. No.: WO2013/051093
PCT Pub. Date: Apr. 11, 2013

(65) Prior Publication Data
US 2014/0200111 A1  Jul. 17, 2014

(51) Int. Cl.
*B60W 20/00* (2006.01)
*B60K 6/48* (2007.10)
*B60K 6/547* (2007.10)
*B60W 10/02* (2006.01)
*F02D 29/02* (2006.01)
*F02N 11/08* (2006.01)
*B60W 10/06* (2006.01)
*B60W 10/11* (2012.01)
*B60W 10/113* (2012.01)
*B60W 30/18* (2012.01)
*B60W 30/19* (2012.01)
*F02N 11/04* (2006.01)

(52) U.S. Cl.
CPC ............... *B60W 20/10* (2013.01); *B60K 6/48* (2013.01); *B60K 6/547* (2013.01); *B60W 10/02* (2013.01); *F02D 29/02* (2013.01); *F02N 11/04* (2013.01); *F02N 11/084* (2013.01); *F02N 11/0844* (2013.01); *Y02T 10/48* (2013.01); *B60W 10/06* (2013.01); *B60W 10/11* (2013.01); *B60W 10/113* (2013.01); *B60W 30/18127* (2013.01); *B60W 30/19* (2013.01); *B60W 2510/0275* (2013.01); *B60W 2510/1005* (2013.01); *B60W 20/40* (2013.01); *B60W 20/1062* (2013.01); *Y10S 903/93* (2013.01); *Y02T 10/6221* (2013.01)

(58) Field of Classification Search
USPC .......................................................... 477/5
See application file for complete search history.

(56) References Cited

U.S. PATENT DOCUMENTS

| 6,811,229 B2 * | 11/2004 | Soga | 188/156 |
| 6,890,283 B2 * | 5/2005 | Aoki | 477/5 |
| 8,700,241 B2 * | 4/2014 | Yoshimura | 701/22 |
| 2012/0234133 A1 | 9/2012 | Ikegami et al. | |

FOREIGN PATENT DOCUMENTS

| JP | A-2009-113535 | 5/2009 |
| JP | A-2010-241331 | 10/2010 |
| WO | WO 2011/043347 A1 | 4/2011 |

* cited by examiner

*Primary Examiner* — Jacob S Scott
(74) *Attorney, Agent, or Firm* — Oliff PLC

(57) ABSTRACT

A hybrid vehicle control apparatus is provided with: a first replacement controlling device which replaces regenerative braking torque of the rotating electrical machine by engagement torque of the clutch if probability of starting an internal combustion engine is high on demand of changing a connection state between a rotating electrical machine and a transmission mechanism in regenerative braking by the regenerative braking torque of the rotating electrical machine; and a second replacement controlling device which replaces the regenerative braking torque by friction braking torque if the start probability is low on the change demand.

4 Claims, 7 Drawing Sheets

HYBRID VEHICLE CONTROL APPARATUS

TECHNICAL FIELD

The present invention relates to a hybrid vehicle control apparatus for controlling a hybrid vehicle having a stepped transmission between a rotating electrical machine and an axle.

BACKGROUND ART

It is known that so-called regenerative braking using a regenerative braking force of the rotating electrical machine is performed on deceleration demand of this type of hybrid vehicle. In the regenerative braking, a rotational speed of the rotating electrical machine decreases with deceleration of the vehicle.

On the other hand, in a configuration in which the stepped transmission is provided between the rotating electrical machine and the axle, it is possible to hold the rotational speed of the rotating electrical machine in a rotational speed region in which the rotating electrical machine has good output characteristics, for a longer time, by sequentially changing a shift position of the stepped transmission to a lower-speed side shift position.

Here, if the shift position is changed in the regenerative braking, the transmission needs to be in a state in which torque does not act. Therefore, during a period in which the shift position is changed, it is necessary to temporarily eliminate the torque of the rotating electrical machine from an input shaft of the transmission, for example, by reducing regenerative torque to a value corresponding to zero-torque or by detaching the rotating electrical machine from the input shaft.

By the way, if the torque of the rotating electrical machine is eliminated from the input shaft of the transmission in this manner, a braking force obtained by the regenerative torque, i.e. the so-called regenerative braking force, is also brought sufficiently close to zero. As a result, although the deceleration is demanded, a reduction in deceleration of the vehicle occurs, which causes a driver to have discomfort and anxiety in some cases.

For such problems, according to a hybrid vehicle disclosed in a patent document 1, if a downshift occurs during the deceleration caused by the regenerative braking force, the regenerative braking force is replaced by a friction braking force caused by a friction brake. Thus, it is considered that it is possible to suppress a variation in the deceleration of the vehicle.

Incidentally, a patent document 2 discloses a technology for a compensating torque reduction in the case where the downshift occurs in the regeneration in a configuration in which a dual clutch transmission (DCT) is provided, by using the friction brake or engine brake. Moreover, it is considered that an engine is started by clutch engagement if the engine brake is used.

Moreover, a patent document 3 discloses a system in which a connection state between a motor output shaft and a transmission input shaft can be changed between IN connection and OUT connection. Moreover, in the configuration, it is also disclosed that the engine is started by inputting motor torque to the engine through a clutch in the IN connection state.

PRIOR ART DOCUMENT

Patent Document

Patent document 1: Japanese Patent Application Laid Open No. 2009-113535
Patent document 2: WO2011-043347
Patent document 3: Japanese Patent Application Laid Open No. 2010-241331

DISCLOSURE OF INVENTION

Subject to be Solved by the Invention

The hybrid vehicle in which the regenerative braking is performed frequently adopts such a configuration that the clutch is disposed between an internal combustion engine and an input shaft of the stepped transmission, in order to improve regenerative efficiency in the regenerative braking and in order to reduce a friction loss in driving of an electric vehicle (EV).

At this time, in the configuration that the regenerative braking force is replaced by the friction braking force given through the friction brake as in the apparatus disclosed in the patent document 1, if a demand is made to start the internal combustion engine, the clutch is moved from a non-engagement state to an engagement state and engagement torque of the clutch is inputted to an engine output shaft of the internal combustion engine, by which the internal combustion engine is started. Therefore, there is possibly a time delay until the internal combustion engine is actually started, and the hybrid vehicle possibly has an insufficient acceleration response.

Incidentally, in the apparatus disclosed in the patent document 2, if the engine start demand is made in a process in which the torque reduction is compensated by the engine brake, it is hardly possible to accidentally suppress the time delay. Such an action, however, is obtained merely accidentally, and it cannot be a drastic solution for the problem described above. This is also the same in the apparatus disclosed in the patent document 3. Incidentally, if the engine start demand is made in the process in which the torque reduction is compensated by the engine torque, the number of revolutions of the engine increases regardless of during the deceleration, and there is thus a possibility that the driver has discomfort.

In other words, in the conventional technology, there is such a technical problem that the internal combustion engine cannot be started quickly and certainly if the demand to start the internal combustion engine is made when the downshift occurs in the regenerative braking.

In view of the aforementioned problems, it is therefore an object of the present invention to provide a hybrid vehicle control apparatus capable of starting the internal combustion engine quickly and certainly in the case as described above without increasing the number of revolutions of the engine in an unnecessary situation.

Means for Solving the Subject

The above object of the present invention can be achieved by a hybrid vehicle control apparatus for controlling a hybrid vehicle, the hybrid vehicle provided with: an internal combustion engine; a transmission mechanism having a plurality of shift positions with mutually different gear ratios and capable of changing a transmission gear ratio as a ratio of rotational speeds between an input shaft and an output shaft connected to wheels in accordance with the shift positions; a clutch capable of cutting off an engine output shaft of the internal combustion engine and the input shaft; a rotating electrical machine capable of inputting/outputting torque via the input shaft; and a brake apparatus capable of applying friction braking torque to the wheels, the hybrid vehicle capable of connecting an output shaft of the rotating electrical machine to a shaft different from the input shaft to which the engine output shaft is connected in the transmission mechanism, the hybrid vehicle control apparatus provided with: a first replacement controlling device which replaces regenerative braking torque of the rotating electrical machine by engagement torque of the clutch if probability of starting the internal combustion engine is high on demand of changing a connection state between the rotating electrical machine and the transmission mechanism in regenerative braking by the regenerative braking torque of the rotating electrical machine; and a second replacement controlling device which replaces the regenerative braking torque by the friction braking torque if the start probability is low on the change demand (Claim 1).

The hybrid vehicle of the present invention adopts such a configuration that the output shaft of the rotating electrical machine and the engine output shaft of the internal combustion engine are connected to the input shaft of a stepped transmission mechanism having the plurality of shift positions. However, the output shaft of the rotating electrical machine can be connected to the shaft different from the input shaft to which the engine output shaft is connected in the transmission mechanism. In other words, conceptually speaking, if the engagement torque of the clutch is inputted to the engine output shaft via the clutch from the input shaft of the transmission mechanism to start the internal combustion engine, the rotating electrical machine can be connected at a connection position at which the engagement torque does not act. Specifically, the output shaft of the rotating electrical machine can be connected to an input shaft different from the input shaft with which the engine output shaft engages or can be connected to the output shaft of the transmission mechanism.

As an example of such a transmission mechanism or a transmission including an additional clutch, for example, a DCT and an automated manual transmission (AMT) are listed.

In the case of the former (DCT), the transmission mechanism has two pairs of input and output shafts in advance and a plurality of shift positions between each pair of the input and the output shaft. The engine output shaft is selectively connected to the input shaft in one of the two pairs of input and output shafts via the clutch provided for each pair (i.e. dual clutch). At this time, the output shaft of the rotating electrical machine is coupled with the input shaft in the other not-selected pair of input and output shafts. Alternatively, the output shaft of the rotating electrical machine can be coupled with the input shaft in the other not-selected pair of input and output shafts. By virtue of such a configuration, it is not necessary to act the engagement torque on the output shaft of the rotating electrical machine when the engagement torque of the clutch is inputted to the engine output shaft.

Incidentally, the hybrid vehicle of the present invention may be provided with a plurality of rotating electrical machines, and at least one of the rotating electrical machines may be connected to both the two input shafts provided for the DCT. In this case, the rotating electrical machine is connected to the input shaft to which the engine output shaft of the internal combustion engine is connected; however, if only any one of the rotating electrical machines can be set active in the regenerative braking (i.e. the regenerative torque is outputted) and the engine output shaft is coupled with the input shaft different from the one for the active rotating electrical shaft, this can results in the aforementioned aspect. Alternatively, the rotating electrical machine connected to the input shaft different from the input shaft with which the engine output shaft is coupled may be set as the active rotating electrical machine.

Incidentally, according to the idea of the DCT for dramatically reducing a power loss associated with a speed change by steadily changing the shift position, normally, an odd-numbered shift position is connected to one input shaft and an even-numbered shift position is connected to the other input shaft in many cases. On the other hand, in starting the internal combustion engine, the engagement torque inputted to the engine output shaft is preferably large, and thus, the engine output shaft is normally connected to the odd-numbered position having a first-speed position at the start in many cases. If so, in such a configuration that one rotating electrical machine is provided, the rotating electrical machine may be connected to the input shaft associated with the pair of input and output shafts that has the even-numbered shift position.

On the other hand, in the case of the latter (AMT), the transmission mechanism is provided with only one pair of input and output shafts and is provided additionally with a control mechanism for performing a clutch operation and a shift position change operation in an automated manner. Therefore, if the output shaft of the rotating electrical machine is simply connected to the input shaft, an engine rotational speed of the internal combustion engine and a rotational speed of the rotating electrical machine become equal to each other, and it is thus hardly possible to sufficiently obtain such a benefit of the hybrid vehicle that a driving force source is controlled in the best active region of each device. From this standpoint, if the AMT is adopted as the transmission mechanism of the present invention or the transmission including the additional clutch, the rotating electrical machine is preferably configured to be selectively connected to both the input shaft and the output shaft of the transmission mechanism. Alternatively, moreover, there may be prepared a neutral position at which the rotating electrical machine is connected to neither the input shaft nor the output shaft.

Here, for example, if a downshift demand is made in order to include the rotational speed of the rotating electrical machine within a predetermined range or for a similar purpose in association with a reduction in a vehicle speed in a regenerative braking period, the shift position cannot be changed in the condition that the regenerative torque is supplied to the input shaft. In this case, there can be a need to take such a measure as setting zero torque for the rotating electrical machine (i.e. into an idling state) or detaching the rotating electrical machine from the input shaft (including a change of a connection destination to the neutral position and the output shaft of the AMT, described above).

In other words, there can be a demand to change the connection state between the rotating electrical machine and the input shaft. Incidentally, a demand to change the shift position associated with the reduction in the vehicle speed caused by the regenerative braking may be treated as this type of change demand. Moreover, the connection state change may mean an operation in which the shift position before the change moves through temporal state transition to the shift position after the change on the shift position change and the rotating electrical machine is coupled with the input shaft again.

If such a demand to change the connection state is made, a regenerative braking force at that time point varies to no small extent. In particular, in the case of a temporal state transition of the rotating electrical machine into the idling state, the regenerative braking force is brought sufficiently close to zero even temporarily. Therefore, deceleration decreases from the viewpoint of behavior of the hybrid vehicle, and if no measures are taken, the vehicle relatively accelerates.

As a measure to prevent such a situation, conventionally, there are known a friction braking force caused by the friction braking torque, inertia braking (so-called engine brake) caused by clutch engagement torque, and the like as described above; however, a selection criterion thereof is conventionally not clear at all. Moreover, a concept of selectively using them is conventionally non-existent. This is because only suppression of the deceleration reduction caused by a regenerative braking torque reduction is used to be advocated. There used to be no clear difference even by using any means as long as the regenerative braking torque can be replaced.

However, in a case where the regenerative braking torque is replaced, for example, by the friction braking torque using an electronic controlled braking system (ECB) or the like, if a demand to start the internal combustion engine is made during the replacement, the input of the engagement torque due to the clutch engagement is started after the completion of the connection state change to start to rotate the internal combustion engine. The demand to start the internal combustion engine is accompanied by a demand to accelerate the vehicle regardless of its magnitude in many cases. Thus, if it is necessary to complete such a process, a start delay of the internal combustion engine is actualized as a reduction in drivability due to an acceleration delay.

For such problems, the hybrid vehicle control apparatus of the present invention is configured such that the braking torque by which the regenerative braking torque is to be replaced (hereinafter expressed as "replacement braking torque" as occasion demands) is properly selected or changed in accordance with the high or low probability of starting the internal combustion engine. The use of the replacement braking torque in this manner is realized by the first and second replacement controlling devices which can adopt, for example, forms of various computer apparatuses or the like.

In other words, the first replacement controlling device replaces the regenerative braking torque by the engagement torque of the clutch if the probability of starting the internal combustion engine is high on the change demand. On the other hand, the second replacement controlling device replaces the regenerative braking torque by the friction braking torque if the probability of starting the internal combustion engine is low on the change demand. Incidentally, the friction braking torque is torque having a unique relation with a braking force applied to the wheels.

Here, the start probability literally means the probability that the internal combustion engine will start in the near future or in the future. Incidentally, the "near future" may be defined, for example, as a time point after a lapse of time determined experimentally, experientially, or theoretically in advance as a time length from that time point which is long enough to at least sufficiently complete the connection state change.

Incidentally, when the first and second replacement controlling devices replace the regenerative braking torque by the replacement braking torque, a process of judging the high or low start possibility as described above is not necessarily required.

For example, if a controlled variable or control amount, a manipulated variable or operation amount, physical quantity, an index value and the like associated with the high or low start probability are determined experimentally, experientially, or theoretically in advance as reference values, the reference values may be compared with a standard value, and the first or second replacement controlling device may operate on the basis of a result of the comparison. By virtue of such a configuration, it is possible to preferably realize the use of the replacement braking torque according to the high or low start probability eventually.

Incidentally, in this case, the standard value may be learned as occasion demands in accordance with whether or not the start demand is actually made. According to the learning as described above, it is possible to reflect a driver's driving pattern, personality, preference or the like, and it is thus possible to eliminate an influence of drivers' individual variations.

According to the hybrid vehicle control apparatus of the present invention, if the demand to start the internal combustion engine is actually made in accordance with the high start probability, the clutch has already held a proper torque capacity and the engagement torque of the clutch has been inputted to the engine output shaft. Therefore, it is possible to effectively reduce a time required for the internal combustion engine to actually start from a time point at which the demand to start the internal combustion engine is made (hereinafter expressed as a "start time length" as occasion demands).

On the other hand, if the start probability is low, i.e. if it can be judged that the demand to start the internal combustion engine will be hardly made in the near future, the regenerative braking torque is replaced by the friction braking torque. If the engagement of the clutch is used as the braking torque, the following situations can occur; namely, a heat load causes a clutch loss or the engine rotational speed increases regardless of during deceleration. By using the friction braking torque, however, it is possible to avoid the occurrence of such problems. Therefore, it is remarkably effective to suppress the reduction in drivability.

As described above, according to the hybrid vehicle control apparatus of the present invention, the engagement torque of the clutch is used as the replacement braking torque by taking into consideration the ensuring of startability in the demand to start the internal combustion engine which can be made in the future when the start probability is high, and the friction braking torque is used as the replacement braking torque in order to avoid an unnecessary increase in the engine rotational speed when the start probability is low. In other words, it is possible to start the internal combustion engine, quickly and certainly, while avoiding the reduction in drivability.

Further to that, according to the present invention, when the regenerative braking torque is actually replaced by another braking torque by proper means, it is possible to select optimum braking torque by foreseeing a subsequent driving state of the hybrid vehicle. Thus, it is possible to obtain an effect of dispelling uneasiness about the vehicle behavior in the future in addition to an effect of stabilizing the vehicle behavior at that time point such as the suppression of the deceleration reduction caused by a braking torque reduction, which is extremely useful in practice.

In one aspect of the hybrid vehicle control apparatus of the present invention, it is further provided with a start controlling device which starts the internal combustion engine by inputting the engagement torque via the clutch from the input shaft to which the engine output shaft is connected in the transmission mechanism to the engine output shaft if a demand to start the internal combustion engine is made during the replacement of the regenerative braking torque by the engagement torque (Claim 2).

According to this aspect, if the start demand is actually made during the replacement of the regenerative braking torque by the engagement torque, the internal combustion engine can be started while the engagement torque is used as at least one portion of start torque of the internal combustion engine by the start controlling device. Therefore, it is possible to start the internal combustion engine, quickly and certainly.

In another aspect of the hybrid vehicle control apparatus of the present invention, it is further provided with: a change controlling device which changes the connection state on the demand of changing the connection state; and a start controlling device which starts the internal combustion engine after completion of the connection state change if a demand to start the internal combustion engine is made during the connection state change (Claim 3).

According to this aspect, the connection state is changed by the change controlling device on the demand of changing the connection state described above. Here, if the demand to start the internal combustion engine is made during the change of the connection state between the rotating electrical machine and the transmission mechanism, the change controlling device changes the connection state without delay, and the start controlling device starts the internal combustion engine after the completion of the connection state change. Therefore, according to this aspect, it is possible to certainly maintain the connection between the rotating electrical machine and the transmission mechanism.

In another aspect of the hybrid vehicle control apparatus of the present invention, it is further provided with: a change controlling device which changes the connection state on the demand of changing the connection state; and a start controlling device which starts the internal combustion engine by inputting the engagement torque via the clutch from the input shaft to which the engine output shaft is connected in the transmission mechanism to the engine output shaft if a demand to start the internal combustion engine is made after completion of the connection state change (Claim 4).

According to this aspect, the connection state is changed by the change controlling device on the demand of changing the connection state described above. Here, if the demand to start the internal combustion engine is made after the completion of the change of the connection state between the rotating electrical machine and the transmission mechanism, the start controlling device inputs the engagement torque of the clutch to the engine output shaft of the internal combustion engine and starts the internal combustion engine by using the engagement torque as at least one portion of the start torque. At this time, since the connection state change has been already completed, the start delay is not actualized when the internal combustion engine is started, and the internal combustion engine can be started without delay.

The operation and other advantages of the present invention will become more apparent from the embodiments explained below.

MODE FOR CARRYING OUT THE INVENTION

Embodiments of the Invention

Hereinafter, with reference to the drawings as occasion demands, various embodiments of the present invention will be explained.

1: First Embodiment 1.1: Configuration of Embodiment

Figure 1:
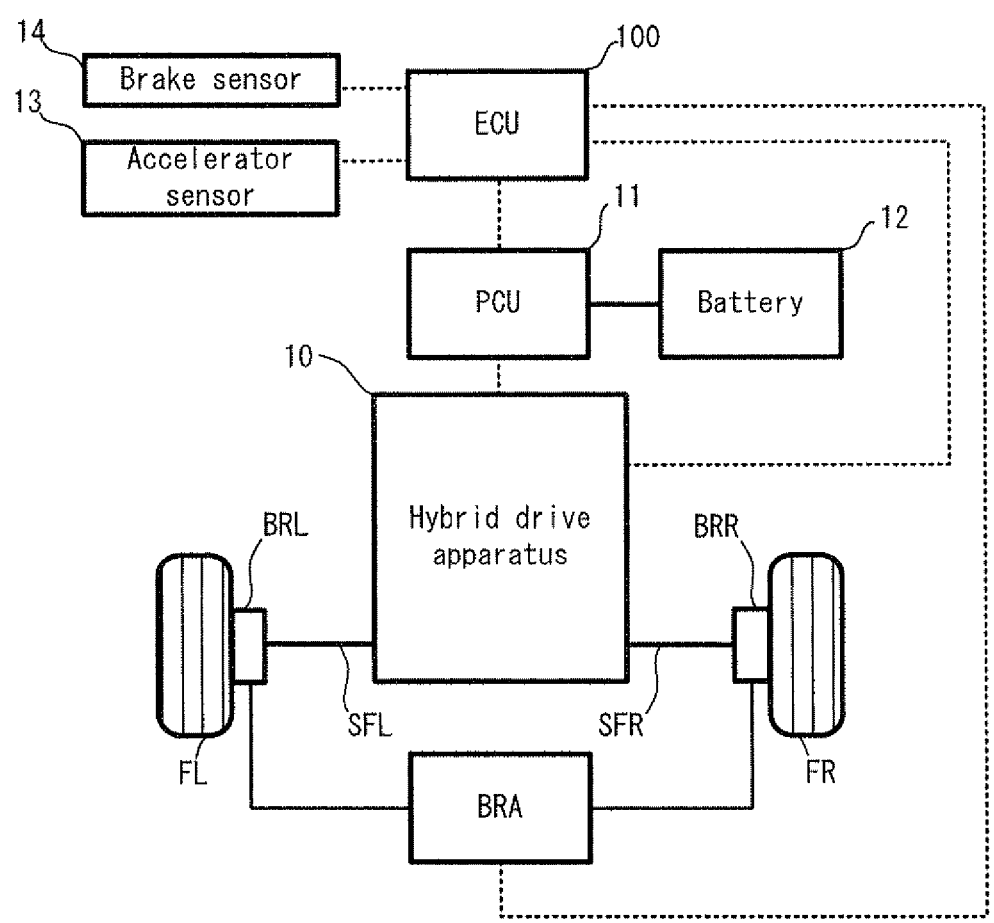
FIG. 1 is a schematic configuration diagram conceptually showing a configuration of a hybrid vehicle in a first embodiment of the present invention.

Firstly, with reference to FIG. 1, a configuration of a hybrid vehicle 1 in a first embodiment of the present invention will be explained. FIG. 1 is a schematic configuration diagram conceptually showing the configuration of the hybrid vehicle 1.

In FIG. 1, the hybrid vehicle 1 is provided with: an ECU 100; a power control unit (PCU) 11; a battery 12; an accelerator sensor 13; a brake sensor 14; a brake actuator BRA; a right brake apparatus BRR and a left brake apparatus BRL; and a hybrid drive apparatus 10. The hybrid vehicle 1 is one example of the "hybrid vehicle" of the present invention.

The electronic control unit (ECU) 100 is provided with a central processing unit (CPU), a read only memory (ROM), a RAM and the like. The ECU 100 is an electronic control unit capable of controlling the operations of each part of the hybrid vehicle 1. The ECU 100 is one example of the "hybrid vehicle control apparatus" of the present invention. The ECU 100 can perform a connecting position change control process described later, in accordance with a control program stored in the ROM.

Incidentally, the ECU 100 is an integrated electronic control unit configured to function as one example of each of the "first replacement controlling device" and the "second replacement controlling device" of the present invention, and all the operations of the respective devices are performed by the ECU 100. However, the physical, mechanical and electrical configurations of each of the aforementioned devices of the present invention are not limited to this. For example, each of the devices may be configured as various computer systems such as a plurality of ECUs, various processing units, various controllers or microcomputer apparatuses.

The hybrid drive apparatus 10 is a drive unit for driving the hybrid vehicle 1 by supplying driving torque as a driving force to a left axle SFL (corresponding to a left front wheel FL) and a right axle SFR (corresponding to a right front wheel FR) which are axles of the hybrid vehicle 1. A detailed configuration of the hybrid drive apparatus will be described later.

The PCU 11 includes a not-illustrated inverter which can convert direct-current (DC) power extracted from the battery 12 to alternating-current (AC) power and supply it to a motor generator MG described later and which can convert AC power as regenerative electric power of the motor generator MG to DC power and supply it to the battery 12. Moreover, the PCU 11 is a control unit capable of controlling the input/output of the electric power between the battery 12 and the motor generator MG. The PCU 11 is electrically connected to the ECU 100, and the operations of the PCU 11 are controlled by the ECU 100.

The battery 12 is a storage battery device which has such a configuration that a plurality (e.g. several hundreds) of unit battery cells such as lithium ion battery cells are connected in series and which functions as a power supply source of the motor generator MG The accelerator sensor 13 is a sensor capable of detecting a manipulated variable or operation amount Aa of a not-illustrated accelerator pedal of the hybrid vehicle 1. The accelerator sensor 13 is electrically connected to the ECU 100, and the detected manipulated variable Aa is referred to by the ECU 100 with a regular or irregular period.

The brake sensor 14 is a sensor capable of detecting a manipulated variable or operation amount Ab of a not-illustrated brake pedal of the hybrid vehicle 1. The brake sensor 14 is electrically connected to the ECU 100, and the detected manipulated variable Ab is referred to by the ECU 100 with a regular or irregular period.

The left brake apparatus BRL is an apparatus capable of applying a friction braking force via a brake member such as a brake pad to the left front wheel FL. Friction braking torque for defining a braking force of the left brake apparatus BRL varies depending on a brake fluid pressure supplied to a wheel cylinder of each wheel from the brake actuator BRA.

The right brake apparatus BRR is an apparatus capable of applying a friction braking force via a brake member such as a brake pad to the right front wheel FR. Friction braking torque for defining a braking force of the right brake apparatus BRR varies depending on a brake fluid pressure supplied to a wheel cylinder of each wheel from the brake actuator BRR.

The brake actuator BRA is an actuator which is provided with: a master cylinder connected to a not-illustrated brake pedal; a brake fluid pipe leading to each wheel cylinder from the master cylinder; an electromagnetic valve and an electric oil pump apparatus provided for the brake fluid pipe as occasion demands; and the like and which constitutes a known ECB. Incidentally, in FIG. 1, the brake actuator BRA and the aforementioned left and right brake apparatuses constitute one example of the "brake apparatus" of the present invention. The brake actuator BRA is an actuator capable of performing increase/decrease control of the brake fluid pressure via the electric oil pump, supplied hydraulic pressure control of each wheel cylinder via opening/closing control of each electromagnetic valve, and the like. The brake actuator BRA is electrically connected to the ECU 100, and the friction braking torque of the aforementioned left and right brake apparatuses is controlled by the ECU 100.

Figure 2:
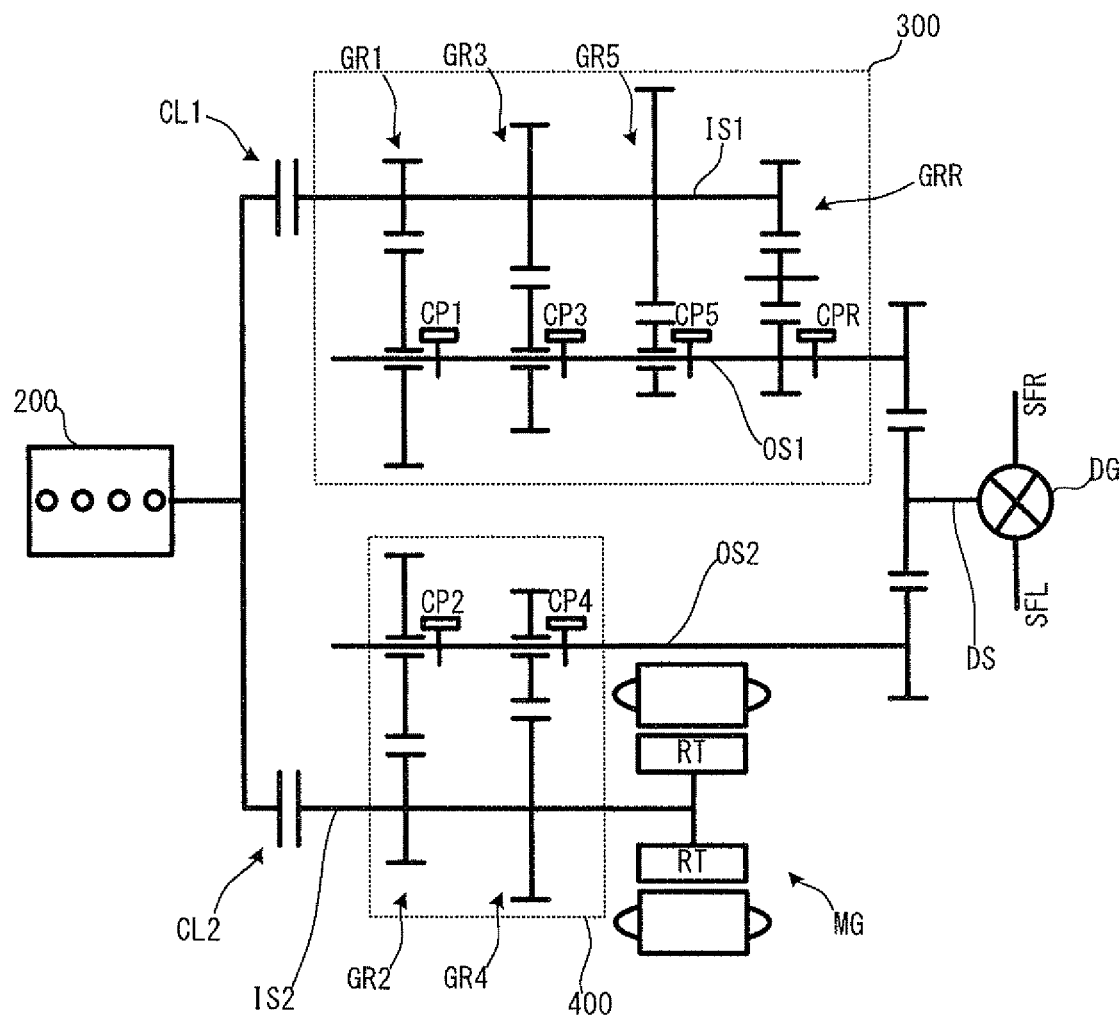
FIG. 2 is a schematic configuration diagram conceptually showing a configuration of a hybrid drive apparatus in the hybrid vehicle in FIG. 1.

Next, with reference to FIG. 2, the detailed configuration of the hybrid drive apparatus 10 will be explained. FIG. 2 is a schematic configuration diagram conceptually showing the configuration of the hybrid drive apparatus 10. Incidentally, in FIG. 2, portions overlapping those of FIG. 1 will carry the same reference numerals, and the explanation thereof will be omitted as occasion demands.

In FIG. 2, the hybrid drive apparatus 10 is provided with an engine 200, a motor generator MG, a first clutch CL1, a second clutch CL2, a first transmission mechanism 300, and a second transmission mechanism 400.

The engine 200 is a gasoline engine as one example of the "internal combustion engine" of the present invention, which is configured to function as a main power source of the hybrid vehicle 1. The engine 200 is a known gasoline engine and the detailed configuration thereof will be omitted here. A not-illustrated crankshaft as an engine output shaft of the engine 200 is coupled with respective clutch plates (whose reference numerals are omitted) of the first clutch CL1 and the second clutch CL2. If either one of the first clutch CL1 and the second clutch CL2 is in an engagement state, engine torque Te as output torque of the engine 200 is transmitted to a first input shaft IS1 of the first transmission mechanism 300 or a second input shaft IS2 of the second transmission mechanism 400 via the clutch which is in the engagement state.

The engine torque Te transmitted to either one of the input shafts is converted in accordance with a gear position of the transmission mechanism of interest (one example of the "shift position" of the present invention) and is outputted to the aforementioned left and right axles via various gear apparatuses, a drive shaft DS, and a differential DG, from an output shaft of the transmission mechanism of interest. In other words, the hybrid drive apparatus 10 has a so-called dual clutch transmission (DCT) as a transmission (power transmitting apparatus).

Incidentally, the engine 200 is merely one example of practical aspects which can be adopted by the internal combustion engine of the present invention. As the practical aspects of the internal combustion engine of the present invention, not only the engine 200 but also various known engines can be adopted.

The motor generator MG is an electric motor generator provided with: a power running function for converting electrical energy into kinetic energy; and a regeneration function for converting the kinetic energy into the electrical energy. The motor generator MG is one example of the "rotating electrical machine" of the present invention. Incidentally, the motor generator MG is configured as a synchronous electric motor generator, and it is provided with: a rotor having a plurality of permanent magnets on the outer circumferential surface; and a stator around which a three-phase coil for forming a rotating magnetic field is formed; however, of course, it may have another configuration.

The first clutch CL1 is a hydraulic control wet multi-plate engaging apparatus as one example of the "clutch" of the present invention. The first clutch CL1 has a pair of clutch plates. One of the clutch plates is coupled with the crankshaft of the engine 200 as described above, and the other clutch plate is coupled with the first input shaft IS1 described later of the first transmission mechanism 300.

Therefore, if the clutch plates are in the engagement state, the crankshaft of the engine 200 and the first input shaft IS1 of the first transmission mechanism 300 are mechanically coupled with each other. Incidentally, the first clutch CL1 is an automatic clutch in which hydraulic control is automated by the action of a not-illustrated actuator. This actuator is electrically connected to the ECU 100, and a connection/disconnection state of both the clutch plates of the first clutch CL1 can vary depending on the control of the ECU 100.

The second clutch CL2 is a hydraulic control wet multi-plate engaging apparatus as another example of the "clutch" of the present invention. The second clutch CL2 has a pair of clutch plates. One of the clutch plates is coupled with the crankshaft of the engine 200 as described above, and the other clutch plate is coupled with the second input shaft IS2 described later of the second transmission mechanism 400.

Therefore, if the clutch plates are in the engagement state, the crankshaft of the engine 200 and the second input shaft IS2 of the second transmission mechanism 400 are mechanically coupled with each other. Incidentally, the second clutch CL2 is an automatic clutch in which hydraulic control is automated by the action of a not-illustrated actuator. This actuator is electrically connected to the ECU 100, and a connection/disconnection state of both the clutch plates of the second clutch CL2 can vary depending on the control of the ECU 100.

Incidentally, both the first clutch CL1 and the second clutch CL2 are not in the engagement state simultaneously, even though both of the clutches may take in a non-engagement state simultaneously.

The first transmission mechanism 300 is provided with the first input shaft IS1 and a first output shaft OS1 and is one example of the "transmission mechanism" of the present invention capable of changing a transmission gear ratio, which is a ratio of a rotational speed of the first input shaft IS1 and a rotational speed of the first output shaft OS1, in accordance with a selected gear position.

The first transmission mechanism 300 is provided with: forward gear positions which are a first-speed gear position GR1, a third-speed gear position GR3, and a fifth-speed gear position GR5; and a reverse gear position GRR, as the "shift positions" of the present invention. The rotational speed of the first output shaft OS1 with respect to the rotational speed of the first input shaft IS1 in each of the front gear positions increases in the order of the fifth-speed gear position GR5, the third-speed gear position GR3, and the first-speed gear position GR1. In other words, in the first transmission mechanism 300, the first-speed gear position GR1 is the lowest gear position, and the fifth-speed gear position GR5 is the highest gear position.

In the first transmission mechanism 300, a connection state between the first-speed gear position GR1 and the first output shaft OS1, a connection state between the third-speed gear position GR3 and the first output shaft OS1, a connection state between the fifth-speed gear position GR5 and the first output shaft OS1, and a connection state between the reverse gear position GRR and the first output shaft OS1 are controlled by coupling mechanisms CP1, CP3, CP5, and CPR, respectively.

In other words, if the first-speed gear position GR1 and the first output shaft OS1 are coupled by the coupling mechanism CP1, the first-speed gear position GR1 is the selected gear position of the first transmission mechanism 300. In the same manner, if the third-speed, fifth-speed, and reverse gear positions GR3, GR5, or GRR and the first output shaft OS1 are coupled by the coupling mechanism CP3, CP5, or CPR, the third-speed, fifth-speed, or reverse gear position GR3, GR5, or GRR is the selected gear position of the first transmission mechanism 300, respectively. Each coupling mechanism is electrically connected to the ECU 100, and at most one coupling mechanism connects the first output shaft OS1 and each gear position by the control of the ECU 100.

The second transmission mechanism 400 is provided with the second input shaft IS2 and a second output shaft OS2 and is one example of the "transmission mechanism" of the present invention capable of changing a transmission gear ratio, which is a ratio of a rotational speed of the second input shaft IS2 and a rotational speed of the second output shaft OS2, in accordance with a selected gear position.

The second transmission mechanism 400 is provided with: forward gear positions which are a second-speed gear position GR2 and a fourth-speed gear position GR4, as the "shift position" of the present invention. The rotational speed of the second output shaft OS2 with respect to the rotational speed of the second input shaft IS2 in each of the gear positions increases in the order of the fourth-speed gear position GR4 and the second-speed gear position GR2. In other words, in the second transmission mechanism 400, the second-speed gear position GR2 is the lowest gear position, and the fourth-speed gear position GR4 is the highest gear position.

In the second transmission mechanism 400, a connection state between the second-speed gear position GR2 and the second output shaft OS2 and a connection state between the fourth-speed gear position GR4 and the second output shaft OS2 are controlled by coupling mechanisms CP2 and CP4, respectively. In other words, if the second-speed gear position GR2 and the second output shaft OS2 are coupled by the coupling mechanism CP2, the second-speed gear position GR2 is the selected gear position of the second transmission mechanism 400. In the same manner, if the fourth-speed gear position GR4 and the second output shaft OS2 are coupled by the coupling mechanism CP4, the fourth-speed gear position GR4 is the selected gear position of the second transmission mechanism 400. Each coupling mechanism is electrically connected to the ECU 100, and at most one coupling mechanism connects the second output shaft OS2 and each gear position by the control of the ECU 100.

Incidentally, a MG output shaft (one example of the "output shaft of the rotating electrical machine" of the present invention) which rotates integrally with a rotor RT of the aforementioned motor generator MG is coupled with the second input shaft IS2 of the second transmission mechanism 400. Moreover, the output shaft of each transmission mechanism is coupled with the drive shaft DS. Therefore, in the hybrid drive apparatus 10, the engine torque Te of the engine 200 via the first transmission mechanism 300, the engine torque Te of the engine 200 via the second transmission mechanism 400, and MG torque Tmg as output torque of the motor generator MG are transmitted to each axle via the differential DG.

<1.2: Operation of Embodiment>
<1.2.1: Regenerative Braking>

In the hybrid vehicle 1, regenerative braking can be performed in one portion of braking by using a power regenerating action of the motor generator MG provided for the hybrid drive apparatus 10. The regenerative braking indicates an operation of providing deceleration for the hybrid vehicle 1 while performing power regeneration by using regenerative torque of the motor generator MG as braking torque. For example, if a vehicle speed Vv of the hybrid vehicle 1 is sufficiently high (e.g. several tens km/h or higher) and if a time change in the manipulated variable or operation amount Ab of the brake pedal, in other words, in coast deceleration and slow deceleration, the regenerative braking is preferably used.

In the regenerative braking, the engine 200 is set into a non-operating and stop state, and engagement of the clutch corresponding to the transmission mechanism connected to the engine 200 at that time point is released. This is a measure to reduce a friction loss of the engine 200 and to improve regeneration efficiency of the motor generator MG.

On the other hand, in the course of performing the regenerative braking in this manner, the vehicle speed Vv gradually decreases. Along with that, a MG rotational speed Nmg as a rotational speed of the motor generator MG coupled with the second output shaft OS2 also gradually decreases. If, however, the MG rotational speed Nmg decreases excessively, sufficient torque cannot be outputted to the second output shaft OS2 in a case where an operating state is changed from a regenerating state to a power running state depending on output characteristics of the motor generator MG in some cases. In other words, it is desirable that the motor generator MG has a rotational region in which output efficiency is good and that the MG rotational speed Nmg is maintained in the rotational region as much as possible.

Thus, in the course that the MG rotational speed Nmg decreases with the decrease in the vehicle speed due to the regenerative braking, the fourth-speed gear position GR4 which is a gear position on the high speed side is changed to the second-speed gear position GR2 which is a gear position on the low speed side. Incidentally, if the gear position is changed, a connecting position between the motor generator MG and the second output shaft OS2 is changed. Therefore, in the embodiment, a demand to change the gear position is equivalent with a demand to change the connecting position of the MG. Moreover, the demand to change the connecting position of the MG is one example of the "connection state change" of the present invention.

By the way, each of the gear positions which constitute the second transmission mechanism 400 is mechanically engaged with the second output shaft OS2 by the coupling mechanism CP4 as described above. Therefore, in the condition that torque acts between the motor generator MG and the second output shaft OS2, the connecting position of the motor generator MG cannot be changed. For this reason, when the connecting position of the motor generator MG is changed, the MG torque Tmg is gradually reduced to zero torque in accordance with predetermined gradual-decrease characteristics (incidentally, since the regenerative torque is negative torque, it is gradually increased as an absolute value). Then, disengagement of the coupling mechanism CP4 and an engaging operation of the coupling mechanism CP2 are performed one after another. If the connecting position change is ended, the MG torque Tmg is gradually increased to a desired regenerative torque value in accordance with predetermined gradual-increase characteristics (incidentally, since the regenerative torque is negative torque, it is gradually reduced as an absolute value).

However, since the MG torque Tmg is braking torque for providing the deceleration for the hybrid vehicle 1, the braking torque gradually decreases in the course of the gradual decrease in order to change the connecting position. If no measures are taken, a pseudo-acceleration state referred to a so-called "deceleration reduction" can occur in the hybrid vehicle 1. The deceleration reduction needs to be avoided in terms of both drivability and vehicle driving control.

Here, from the viewpoint of simply ensuring the braking torque, the simplest and most effective way is to replace (or switch) regenerative braking torque by the friction braking torque by the ECB. The ECB can preferably control the braking torque of the brake apparatus for each wheel by the control of the brake actuator BA as described above, and is thus preferable as a compensating element of the braking torque associated with the gradual decrease in the regenerative braking torque.

By the way, in some cases, a demand to start the engine 200 is made during the control of replacing the regenerative braking torque by the friction braking torque. If the demand to start the engine 200 is made, it is necessary to start the engine 200 which is stopped. After the start demand is made, if engagement torque of the first clutch CL1 is inputted to the crankshaft as the engine output shaft of the engine 200, with the first clutch CL1 in the engagement state (while the second clutch CL 2 cannot be connected because the connecting point is being changed), there is a possibility that a start time length of the engine 200 becomes longer and a power performance decreases.

Here, in particular, considering that the engagement torque of the first clutch CL 1 also acts as one type of braking torque, it is also conceivable that the regenerative braking torque may be always replaced by the engagement torque. The replacement by the engagement torque, however, normalizes occurrence of a clutch loss in the first clutch CL1 and moreover, it increases an engine rotational speed NE of the engine 200 regardless of during deceleration. Thus, the replacement by the engagement torque can be a factor to give a driver discomfort; namely, it possibly causes the occurrence of an unnecessary loss and a reduction in drivability.

Thus, in the embodiment, a connecting position change control process is performed by the ECU 100. The connecting position change control process is a process for reasonably and effectively selecting replacement braking torque by which the regenerative braking torque is to be replaced.

1.2.2: Details of Connecting Position Change Control Process

Figure 3:
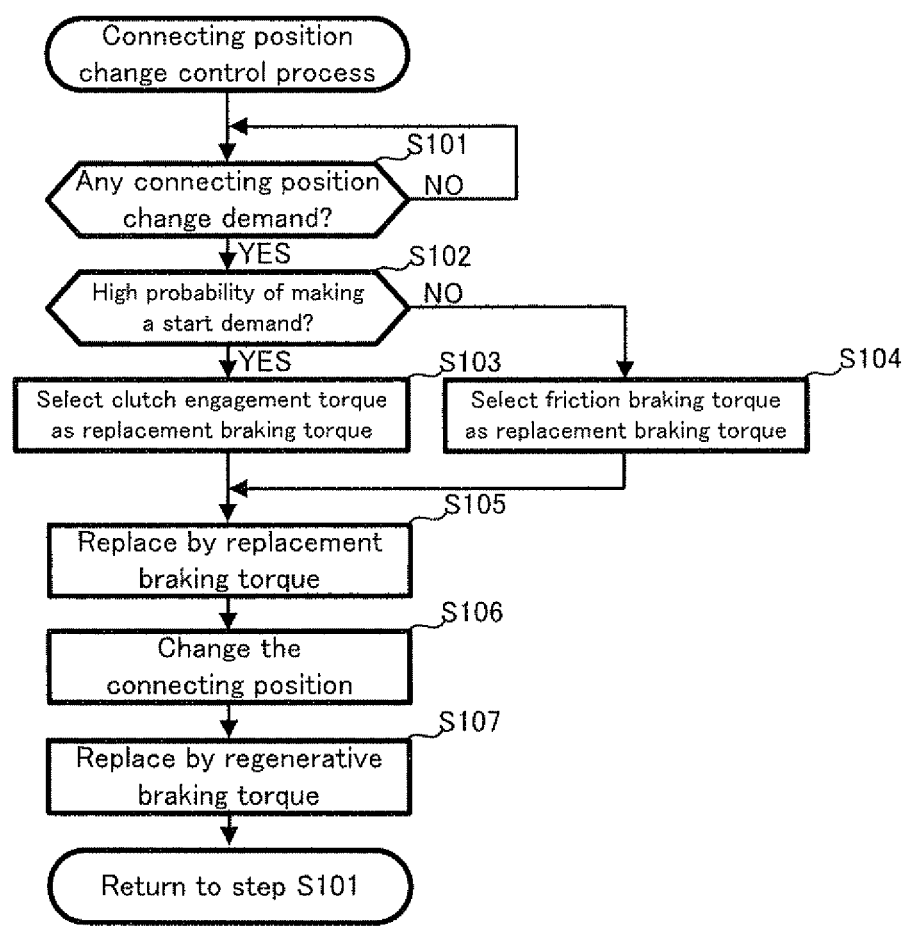
FIG. 3 is a flowchart showing a connecting position change control process performed by an ECU in the hybrid vehicle in FIG. 1.

Next with reference to FIG. 3, the details of the connecting position change control process will be explained. FIG. 3 is a flowchart showing the connecting position change control process.

In FIG. 3, the ECU 100 judges whether or not there is any demand to change the connecting position of the motor generator MG (step S101). If there is no connecting position change demand (the step S101: NO), the ECU 100 sets the process in a standby state.

If there is the connecting position change demand (the step S101: YES), the ECU 100 judges whether the probability of making a demand to start the engine 200 is high or low (step S102).

Here, the "probability of making the demand to start the engine 200" means a probability that the demand to start the engine 200 is made in the not too distant future, for example, during the change of the connecting position of the motor generator MG or the like. In other words, the probability is one example of the "probability of starting the internal combustion engine" of the present invention.

Generally, it is not easy to numerically analyze and predict such a future event. Therefore, in the embodiment, as a relatively light-load method, a manipulated variable or operation amount associated with the probability of making the demand to start the engine 200 is compared with a standard value.

More specifically, the ECU 100 refers to at least one of the manipulated variable or operation amount Aa of the accelerator pedal and the manipulated variable or operation amount Ab of the brake pedal and judges that the probability of making the start demand is "high" if the manipulated variable or operation amount Aa of the accelerator pedal is not zero or if the manipulated variable or operation amount Ab of the brake pedal is less than a standard value of near zero. As an easier example, it is judged that the probability of making the start demand is "high" if the accelerator pedal is stepped on or if the brake pedal is not stepped on.

The aspect of judging the probability of making the start demand as described above is one example, and another manipulated variable or operation amount, physical quantity, controlled variable or control amount, index value or the like may be referred to. Moreover, it may be an aspect in which a driver's habit, preference, personality, ability, driving pattern or the like is learned, in which a weight is applied to an event and a value that actually lead to the start of the engine 200, and in which the probability of making the demand to start the engine 200 is updated as a type of learning value as occasion demands. In this case, it is possible to increase the accuracy of estimating the probability of making the start demand over time, which is preferable.

As a result of indirectly judging the probability of making the start demand in this manner, if the probability of making the start demand is "low" (the step S102: NO), the ECU 100 selects the friction braking torque as the replacement braking torque (step S104). On the other hand, if the probability of making the start demand is "high" (the step S102: YES), the ECU 100 selects the engagement torque of the first clutch CL1 as the replacement braking torque (step S103).

If the proper replacement braking torque is selected, the ECU 100 replaces the regenerative braking torque by the selected replacement braking torque (step S105). At this time, the replacement braking torque is gradually increased so as to correspond to a gradual decrease amount of the regenerative braking torque in a one-to-one manner. If the replacement of the regenerative braking torque by the replacement braking torque is ended and if the entire regenerative braking torque is replaced by the replacement braking torque, the ECU 100 changes the connecting position of the motor generator MG (step S105).

If the connecting position of the motor generator MG is changed, i.e. if the gear position change from the fourth-speed gear position GR4 to the second-speed gear position GR2 is completed in the second transmission mechanism 400, the ECU 100 gradually increases the regenerative braking torque which is replaced by the replacement braking torque and gradually decreases the replacement braking torque. In other words, the ECU 100 replaces again the replacement braking torque by the regenerative braking torque (step S107). If the replacement braking torque is replaced by the regenerative braking torque, the process is returned to the step S101. The connecting position change control process is performed as described above.

According to the connecting position change control process, in a case where the demand to change the connecting position of the motor generator MG is made in the regenerative braking, if it is judged that the probability of making the demand to start the engine 200 is high, the regenerative braking torque is replaced by the engagement torque when the first clutch CL1 is moved into the engagement state. Therefore, if the demand to start the engine 200 is actually made, the clutch engagement torque in which a torque capacity has already increased to some degree can be used as start torque, and the engine 200 can be started, quickly and certainly.

Figure 4:
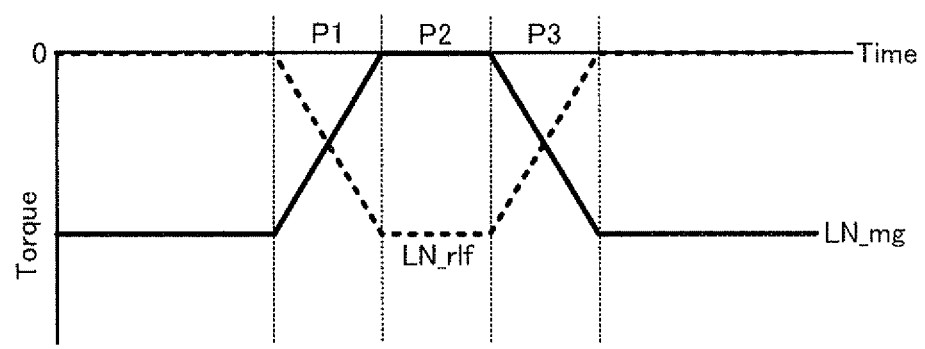
FIG. 4 is a timing chart showing one time transition of braking torque in the course of performing the connecting position change control process in FIG. 3.

Now, with reference to FIG. 4, the connecting position change control process will be visually explained. FIG. 4 is a timing chart showing one time transition of the braking torque in performing the connecting position change control process.

In FIG. 4, a horizontal axis shows time and a vertical axis shows torque.

An illustrated line LN_mg (refer to a solid line) indicates a time transition of the regenerative braking torque, and an illustrated line LN_rlf (refer to a dashed line) indicates a time transition of the replacement braking torque.

Here, an illustrated time domain P1 indicates a period in which the regenerative torque of the motor generator MG is replaced by the replacement braking torque (the engagement torque or the friction braking torque). Moreover, an illustrated time domain P2 indicates a period in which the connecting position of the motor generator MG is replaced. Furthermore, an illustrated time domain P3 indicates a period in which the replacement braking torque is replaced again by the regenerative torque after the connecting position change.

2: Second Embodiment

Next, a connecting position change control process in a second embodiment of the present invention will be explained. The connecting position change control process in the second embodiment is a process for defining a start process of the engine 200 in a case where the step S103 is selected and performed in the connecting position change control process in the first embodiment.

Figure 5:
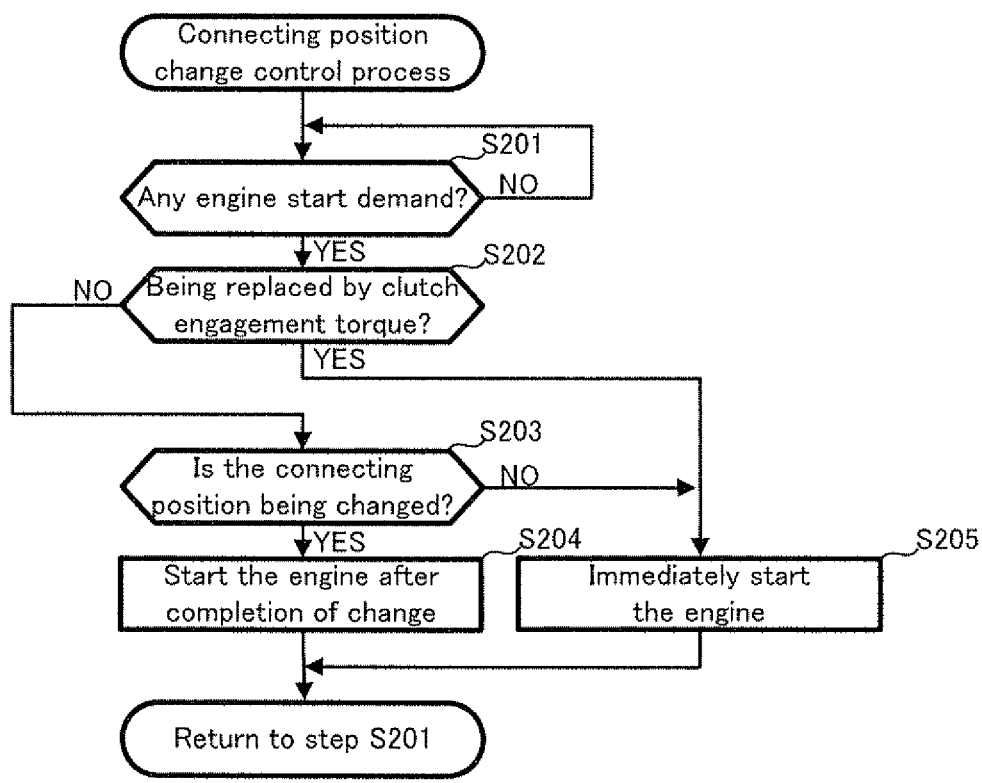
FIG. 5 is a flowchart showing a connecting position change control process in a second embodiment of the present invention.

Firstly, with reference to FIG. 5, the details of the connecting position change control process in the second embodiment will be explained. FIG. 5 is a flowchart showing the connecting position change control process.

In FIG. 5, the ECU 100 judges whether or not the engine start demand is made (step S201). If the engine start demand is not made (the step S201: NO), the ECU 100 repeatedly performs the step S201 and sets the process substantially in the standby state.

If the engine start demand is made (the step S201: YES), the ECU 100 judges whether or not the regenerative braking torque is being replaced by the engagement torque of the first clutch CL1 (incidentally, hereinafter abbreviated as "clutch engagement torque" as occasion demands) (step S202). If the regenerative braking torque is being replaced by the clutch engagement torque (the step S202: YES), the ECU 100 uses the clutch engagement torque which is inputted to the crankshaft, as at least one portion of the start torque and immediately starts the engine 200 (step S205).

On the other hand, if the regenerative braking torque is not being replaced by the clutch engagement torque (the step S202: NO), i.e. if the connecting position of the motor generator MG is being changed or if the clutch engagement torque is being replaced again by the regenerative braking torque after completion of the connecting position change, the ECU 100 judges whether or not the connecting position of the motor generator MG is being changed (step S203). Incidentally, a state in which the step S202 branches to a "NO" side means a state corresponding to the time domain P2 or the time domain P3 in FIG. 4.

If the connecting position is not being changed (the step S203: NO), i.e. if the clutch engagement torque is being replaced again by the regenerative braking torque, the ECU 100 uses the clutch engagement torque which is not replaced, as the start torque and immediately starts the engine 200 (the step S205).

Here, in the step S203, if the connecting position is being changed (the step S203: YES), that means there is no driving force source capable of outputting torque to the drive shaft DS of the hybrid drive apparatus 10 at that time point. In order to avoid such a situation, the ECU 100 gives the highest priority to the change of the connecting position of the motor generator MG and uses the clutch engagement torque as the start torque after the connecting position change to start the engine 200 (step S204).

If the engine 200 is started by the step S204 or the step S205, the process is returned to the step S201. The connecting position change control process in the second embodiment is performed as described above.

Figure 6:
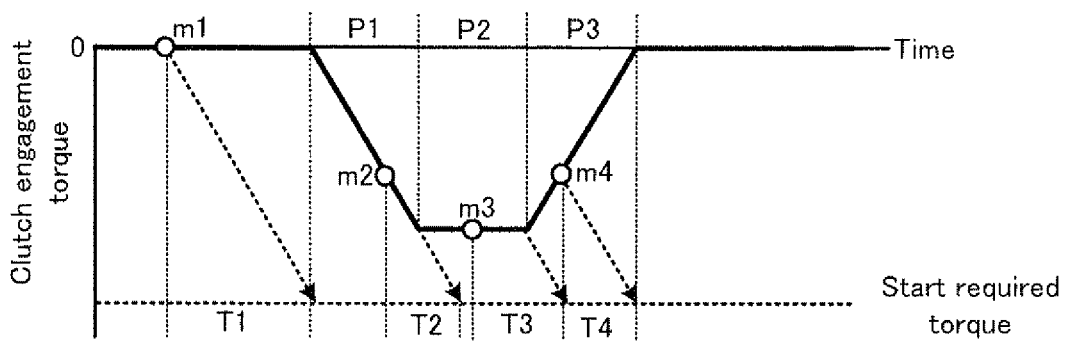
FIG. 6 is a timing chart showing one time transition of clutch engagement torque in the course of performing the connecting position change control process in FIG. 5.

Now, with reference to FIG. 6, the connecting position change control process in the second embodiment will be visually explained. FIG. 6 is a timing chart showing one time transition of the start torque in the course of performing the connecting position change control process in the second embodiment. Incidentally, in FIG. 6, portions overlapping those of FIG. 4 will carry the same reference numerals, and the explanation thereof will be omitted as occasion demands.

In FIG. 6, a horizontal axis corresponds to time and a vertical axis corresponds to the clutch engagement torque. Incidentally, the following points are the same as those in FIG. 4; namely, an illustrated time domain P1 indicates a period in which the regenerative torque is replaced; an illustrated time domain P2 indicates a period in which the connecting position of the motor generator MG is replaced; and an illustrated time domain P3 indicates a period in which the clutch engagement torque is replaced again by the regenerative braking torque.

Here, if the engine start demand is made in the time domain P1 (i.e. if the step S202 in FIG. 5 is "YES"), for example, if the engine start demand is made when the clutch engagement torque is at a time point shown by a white circle m2 illustrated, the engine is immediately started by using the clutch engaging torque as the start torque. Thus, a time for the clutch engagement torque to reach start required torque, which is necessary for the engine start, is an illustrated time value T2.

Moreover, if the engine start demand is made in the time domain P2 (i.e. if the step S203 in FIG. 5 is "YES"), for example, if the engine start demand is made when the clutch engagement torque is at a time point shown by a white circle m3 illustrated, the engine is started by using the clutch engaging torque as the start torque after the completion of the connecting position change. Thus, the time for the clutch engagement torque to reach the start required torque, which is necessary for the engine start, is an illustrated time value T3.

Moreover, if the engine start demand is made in the time domain P3 (i.e. if the step S203 in FIG. 5 is "NO"), for example, if the engine start demand is made when the clutch engagement torque is at a time point shown by a white circle m4 illustrated, the engine is started by using the clutch engaging torque which remains at that time point as the start torque. Thus, a time for the clutch engagement torque to reach the start required torque, which is necessary for the engine start, is an illustrated time value T4.

Here, a time required for the engine start in the normal case (incidentally, the same applies to a case where the regenerative braking torque is replaced by the friction braking torque) corresponds to a case where the engine start demand is made at a time point shown by a white circle m1 illustrated and is an illustrated time value T1. The time value T1 is, as illustrated, a time value which is greater than the time values T2, T3, and T4. In other words, if the regenerative braking torque is replaced by the clutch engagement torque, the engagement torque of the first clutch CL1 in which the torque capacity increases to some extent originally for the purpose of the change of the connecting position of the motor generator can be used to start the engine 200, and thus, the time required to start the engine 200 can be reduced significantly in comparison with the normal case or a case where the replacement is performed by the friction braking torque by the ECB.

Incidentally, in the first and second embodiments, only one motor generator MG is connected to the second input shaft IS2; however, the motor generator may be connected to the first input shaft IS1. The motor generator MG may be connected to both the shafts.

3: Third Embodiment

Next, with reference to FIG. 7, a configuration of a hybrid drive apparatus 20 in a third embodiment of the present invention will be explained.

Figure 7:
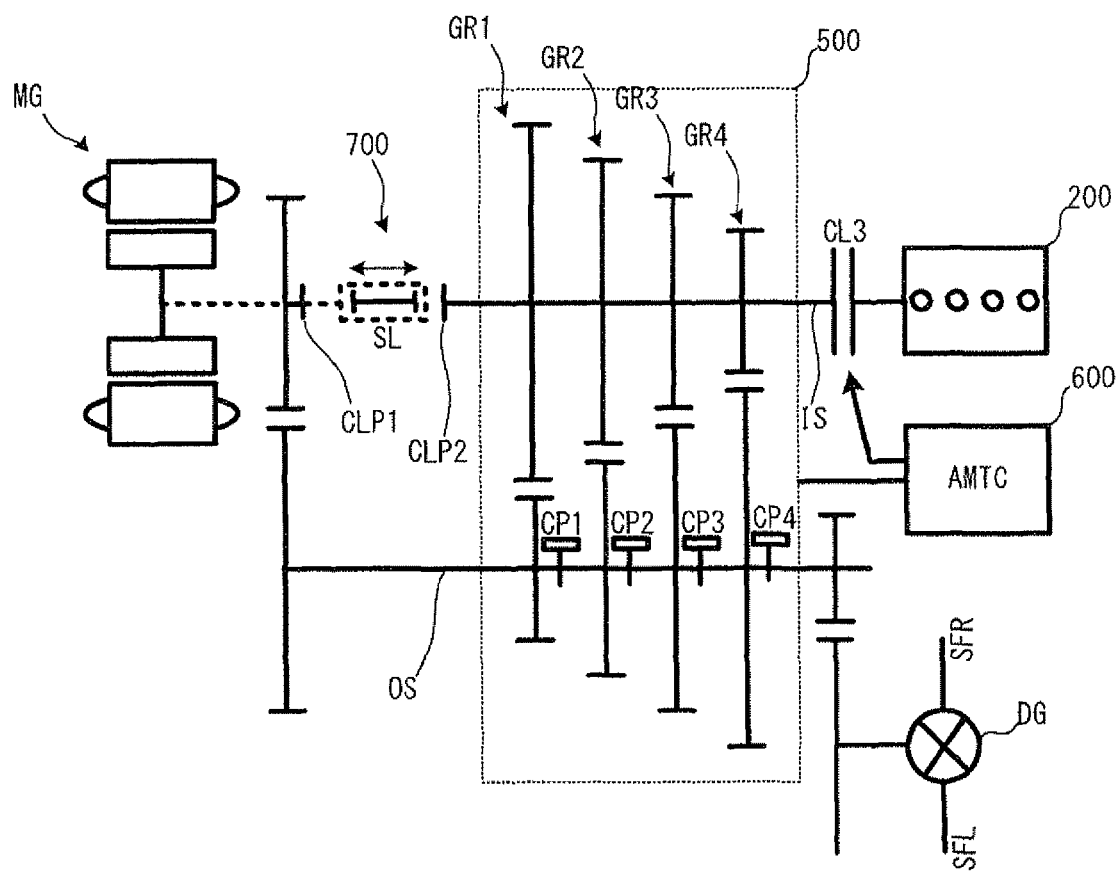
FIG. 7 is a schematic configuration diagram conceptually showing a configuration of a hybrid drive apparatus in a third embodiment of the present invention.

FIG. 7 is a schematic configuration diagram conceptually showing the configuration of the hybrid drive apparatus 20. Incidentally, in FIG. 7, portions overlapping those of FIG. 2 will carry the same reference numerals, and the explanation thereof will be omitted as occasion demands.

In FIG. 7, the hybrid drive apparatus 200 is provided with: a transmission mechanism 500; a clutch CL3; an AMT controller (illustrated AMTC) 600; and a changing apparatus 700.

The transmission mechanism 500 adopts a configuration in which a first-speed gear position GR1, a second-speed gear position GR2, a third-speed gear position GR3, and a fourth-speed gear position GR4 are provided between an input shaft IS and an output shaft OS, as in each transmission mechanism in the first embodiment (incidentally, the reverse gear position is omitted). A connection state between each gear position and the output shaft is realized by a coupling mechanism corresponding to the each gear position. The transmission mechanism 500 is basically equivalent with a gear mechanism of a normal manual transmission (MT). Incidentally, the number of shift positions illustrated is one example, and the number of the shift positions is not limited.

The clutch CL3 is a hydraulic control wet multi-plate engaging apparatus capable of cutting off the input shaft IS of the transmission mechanism 500 and the crankshaft of the engine 200.

The AMT controller 600 is a control apparatus for controlling the engagement state of the clutch CL3 and the connection state between each gear position of the transmission mechanism 500 and the output shaft OS. More specifically, the AMT controller 600 is an integrated controller including: an actuator for driving a clutch late on the transmission mechanism side of the clutch CL3; an actuator for driving each coupling mechanism of the transmission mechanism 500; drive power supplies or the like thereof; drive control systems or the like thereof; and the like. The AMT controller 600 is electrically connected to the ECU 100, and the operations thereof are controlled by the ECU 100. As described above, the hybrid drive apparatus 20 in the embodiment is configured to have an automated manual transmission, i.e. AMT, as a transmission.

On the other hand, the changing apparatus 700 is a dog clutch apparatus capable of changing a connection destination of the MG output shaft, which is an output shaft of the motor generator MG, between the input shaft IS and the output shaft OS. Specifically, the changing apparatus 700 has internal teeth as a tooth-shaped member for engagement, on an inner circumferential surface of an annular sleeve SL coupled with the MG output shaft. The internal teeth can selectively engage with at least one of external teeth as a tooth-shaped member formed on an outer circumferential surface of a clutch plate CLP1 coupled with the output shaft OS and external teeth as a tooth-shaped member formed on an outer circumferential surface of a clutch plate CLP2 coupled with the input shaft IS.

In a state in which the sleeve SL engages with one of the clutch plates, the motor generator MG can input/output torque to/from one of the input/output shaft corresponding to the engaged clutch plate. Normally, the motor generator MG is coupled with the input shaft IS in order to obtain an optimization effect in an active region by a transmission action of the transmission mechanism 500.

Now, an explanation will be given to a case where the connecting position change control explained in the first and second embodiments is applied to the hybrid drive apparatus 20.

In the hybrid drive apparatus 20 in the embodiment, the engine 200 and the motor generator MG share the input shaft IS. Therefore, in the case of the gear position change (the connecting position change) in which the friction braking torque is the replacement braking torque, the replacement braking torque may be gradually increased while the regenerative braking torque of the motor generator MG is gradually decreased; however, if it is necessary to replace the regenerative braking by the clutch engagement torque (the engagement torque of the clutch CL3) in accordance with an engine start probability or engine start demand, the motor generator MG needs to be detached from the input shaft IS.

On the other hand, if the motor generator MG is detached from the input shaft IS in accordance with the engine start probability or engine start demand, there will be no output element of the torque for the output shaft OS. Thus, in this case, the connection destination of the MG rotating shaft is changed to the output shaft OS by the control of the changing apparatus 700. In this case, a rotational speed of the output shaft OS corresponds to the rotational speed of the motor generator MG in a one-to-one manner; however, the torque can be supplied directly from the motor generator MG to the output shaft OS. The aforementioned connecting position change control process can be performed in the same manner by taking this type of measure. Incidentally, in this configuration, the "connection state change" in the present invention means the change of a shaft as the connection destination.

The present invention is not limited to the aforementioned embodiments, but various changes may be made, if desired, without departing from the essence or spirit of the invention which can be read from the claims and the entire specification. A hybrid vehicle control apparatus, which involves such changes, is also intended to be within the technical scope of the present invention.

INDUSTRIAL APPLICABILITY

The present invention can be applied to a hybrid vehicle which is provided with a stepped transmission between a rotating electrical machine and an axle.

DESCRIPTION OF REFERENCE CODES 1 hybrid vehicle
10 hybrid drive apparatus
100 ECU
200 engine
300 first transmission mechanism
400 second transmission mechanism
CL1 first clutch
CL2 second clutch
GR1, GR2, GR3, GR4, GR5, GRR gear position
IS1 first input shaft
IS2 second input shaft
OS1 first output shaft
OS2 second output shaft
MG motor generator

The invention claimed is:

1. A hybrid vehicle control apparatus for controlling a hybrid vehicle,
   the hybrid vehicle including:
      an internal combustion engine;
      a transmission mechanism having a plurality of shift positions with mutually different gear ratios and capable of changing a transmission gear ratio as a ratio of rotational speeds between an input shaft and an output shaft connected to wheels in accordance with the plurality of shift positions;
      a clutch capable of cutting off an engine output shaft of the internal combustion engine and the input shaft;
      a rotating electrical machine capable of inputting/outputting torque via the input shaft; and
      a brake apparatus capable of applying friction braking torque to the wheels, wherein
   the hybrid vehicle is capable of connecting an output shaft of the rotating electrical machine to a shaft different from the input shaft to which the engine output shaft is connected in the transmission mechanism,
   the hybrid vehicle control apparatus comprising:
      a first replacement controlling device configured to replace regenerative braking torque of the rotating electrical machine by engagement torque of the clutch if a probability of starting the internal combustion engine is high on demand of changing a connection state between the rotating electrical machine and the transmission mechanism in regenerative braking by the regenerative braking torque of the rotating electrical machine; and
      a second replacement controlling device configured to replace the regenerative braking torque by the friction braking torque if the probability of starting the internal combustion engine is low on the demand of changing the connection state, wherein
      a condition on whether the probability of starting the internal combustion engine is high or low is determined based on comparing a reference value associated with the probability of starting the internal combustion engine and a predetermined standard value.

2. The hybrid vehicle control apparatus according to claim 1, further comprising a start controlling device which starts the internal combustion engine by inputting the engagement torque via the clutch from the input shaft to which the engine output shaft is connected in the transmission mechanism to the engine output shaft if a demand to start the internal combustion engine is made during the replacement of the regenerative braking torque by the engagement torque.

3. The hybrid vehicle control apparatus according to claim 1, further comprising:
   a change controlling device which changes the connection state on the demand of changing the connection state; and
   a start controlling device which starts the internal combustion engine after completion of the connection state change if a demand to start the internal combustion engine is made during the connection state change.

4. The hybrid vehicle control apparatus according to claim 1, further comprising:
   a change controlling device which changes the connection state on the demand of changing the connection state; and
   a start controlling device which starts the internal combustion engine by inputting the engagement torque via the clutch from the input shaft to which the engine output shaft is connected in the transmission mechanism to the engine output shaft if a demand to start the internal combustion engine is made after completion of the connection state change.

* * * * *